(12) United States Patent
Katz et al.

(10) Patent No.: US 7,076,544 B2
(45) Date of Patent: Jul. 11, 2006

(54) CACHING TECHNIQUES FOR STREAMING MEDIA

(75) Inventors: Ariel Katz, Redmond, WA (US); Yifat Sagiv, Bellevue, WA (US); Guy Friedel, Bellevue, WA (US); David E. Heckerman, Bellevue, WA (US); John R. Douceur, Bellevue, WA (US); Joshua Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 10/104,679

(22) Filed: Apr. 8, 2002

(65) Prior Publication Data

US 2003/0217113 A1   Nov. 20, 2003

(51) Int. Cl.
*G06F 15/173* (2006.01)
*G06F 12/16* (2006.01)
*G06F 15/16* (2006.01)

(52) U.S. Cl. .................. 709/223; 709/224; 709/245; 711/133

(58) Field of Classification Search ............... 709/223, 709/226, 229, 231; 718/104; 711/100, 118, 711/113, 136, 159
See application file for complete search history.

(56) References Cited

U.S. PATENT DOCUMENTS

| 5,452,440 | A | * | 9/1995 | Salsburg .................. 711/136 |
| 5,781,772 | A | * | 7/1998 | Wilkinson et al. ............. 707/3 |
| 5,918,013 | A | * | 6/1999 | Mighdoll et al. ........... 709/217 |
| 6,122,708 | A | * | 9/2000 | Faraboschi et al. ......... 711/118 |
| 6,128,701 | A | * | 10/2000 | Malcolm et al. ............ 711/133 |
| 6,134,643 | A | * | 10/2000 | Kedem et al. ............... 711/213 |
| 6,195,622 | B1 | * | 2/2001 | Altschuler et al. ............. 703/2 |
| 6,269,403 | B1 | * | 7/2001 | Anders ........................ 709/231 |
| 6,314,465 | B1 | * | 11/2001 | Paul et al. ................... 709/226 |
| 6,330,606 | B1 | | 12/2001 | Logue et al. |
| 6,385,641 | B1 | * | 5/2002 | Jiang et al. ................. 709/203 |
| 6,405,256 | B1 | * | 6/2002 | Lin et al. .................... 709/231 |
| 6,453,353 | B1 | * | 9/2002 | Win et al. ................... 709/229 |
| 6,463,508 | B1 | * | 10/2002 | Wolf et al. .................. 711/133 |
| 6,487,663 | B1 | * | 11/2002 | Jaisimha et al. ............ 713/193 |
| 6,523,102 | B1 | * | 2/2003 | Dye et al. ................... 711/170 |

(Continued)

OTHER PUBLICATIONS

Leus, G. et al. Semi-blind channel estimation for block transmissions with non-zero padding Signals, Systems and Computers, 2001. Conference Record of the Thirty-Fifth Asilomar Conference on vol. 1, Nov. 4-7, 2001 pp.:762-766.*

(Continued)

*Primary Examiner*—Saleh Najjar
*Assistant Examiner*—Alicia Baturay
(74) *Attorney, Agent, or Firm*—Workman Nydegger

(57) ABSTRACT

A streaming media caching mechanism and cache manager efficiently establish and maintain the contents of a streaming media cache for use in serving streaming media requests from cache rather than from an original data source when appropriate. The cost of caching is incurred only when the benefits of caching are likely to be experienced. The caching mechanism and cache manager evaluate the request count for each requested URL to determine whether the URL represents a cache candidate, and further analyze the URL request rate to determine whether the content associated with the URL will be cached. In an embodiment, the streaming media cache is maintained with a predetermined amount of reserve capacity rather than being filled to capacity whenever possible.

8 Claims, 10 Drawing Sheets

U.S. PATENT DOCUMENTS

| | | | |
|---|---|---|---|
| 6,665,726 B1* | 12/2003 | Leighton et al. | 709/231 |
| 6,671,735 B1* | 12/2003 | Bender | 709/238 |
| 6,701,316 B1* | 3/2004 | Li et al. | 707/10 |
| 6,732,237 B1* | 5/2004 | Jacobs et al. | 711/119 |
| 6,745,295 B1* | 6/2004 | Rodriguez | 711/136 |
| 6,751,673 B1* | 6/2004 | Shaw | 709/231 |
| 6,772,203 B1* | 8/2004 | Feiertag et al. | 709/219 |
| 6,799,251 B1* | 9/2004 | Jacobs et al. | 711/133 |
| 6,839,803 B1* | 1/2005 | Loh et al. | 711/113 |
| 6,868,452 B1* | 3/2005 | Eager et al. | 709/231 |
| 6,928,518 B1* | 8/2005 | Talagala | 711/135 |
| 2003/0217113 A1* | 11/2003 | Katz et al. | 709/213 |
| 2005/0144319 A1* | 6/2005 | Hillis et al. | 709/245 |

OTHER PUBLICATIONS

Lee, D., et al., "On the Existence of a Spectrum of Policies that Subsumes the Least Recently Used (LRU) and Least Frequently Used (LFU) Policies", *in Proceedings fo the 1999 ACM SIGMETRICS Conference*, May 2-4, 1999, Atlanta Georgia, 10 pages.

Tatarinov, "Cache Policies for Web Servers" retrieved from http://www.cs.ndsu.nodak.edu/~tatarino/cache-policies.ps, pp. 1-22.

AHO, A., et al., "Principles of Optimal Page Placement", *Journal of the Association for Computing Machinery*, vol. 18, No. 1, Jan. 1971, pp. 80-93.

O'Neil, E.J., et al., "The LRU-K Page Replacement Algorithm for Database Disk Buffering" *in Proceedings of the 1993 ACM SIGMOD International Conference on Management Data* 1993, pp. 1-19.

Aggarwal. C., et al., "Caching on the World Wide Web", *IEEE Transaction on Knowledge and Data Engineering*, vol. 11, No. 1, Jan./Feb. 1999, pp. 94-107.

* cited by examiner

```
// This is pseudo-code for the caching algorithm
struct URL_data {
    // For the last n hits, keep track of times, and whether they
    // were from the same user
    Array<Tick> ticks_seen;
    Array<Bit> same_as_last; // parallel to ticks_seen array UserID last_user_id;

FileSize file_size;

// If item is in cache, record where it is
    StreamPointer stream_pointer;

// Optional fields for increased efficiency
    Tick incremental_ticks;
    Double incremental_count;
    Rate rate;
};

Global variables:
URL_data_hashtable: a hash table from URLs to URL_data;
URL_cache_array: an array of URLs currently in the cache;
Tick global_clock;

// We want to compute the average amount of time between accesses
// total amount of ticks until the second time things are seen
double total_second_times = 1000000;
// how many things have been seen at least twice
double count_second_times = 100;

main() {
    for each requested URL {
        // First, do some housekeeping
        Increment global clock by one tick;

// Keep track of average time between hits.  Use average time
        // between first and second hit.
        If this is the second time that this URL was seen {
            increment count_second_times;
            increase total_second_times by number of ticks between first
and second time;
            // Exponential decay so that we're adaptive and don't
overflow
            total_second_times = total_second_times * 0.9999;
            count_second_times = count_second_times * 0.9999;
        }
        If global list of all URLs ever seen is too large, remove some
in LRU order;

URL_data_pointer = URL_data_hashtable.findOrAdd(URL);
        update fields of URL_data_pointer including ticks_seen array,
same_as_last array, last_user_id, and optionally, optional fields;
        if URL is in cache {
            return URL's stream from cache;
        } else {
            return URL's stream from internet;
```

( Continued from Fig 6A )

```
             Consider adding URL to cache: {
                         Set URL_count and URL_rate variables using ComputeRate
    631     subroutine;
                         If URL_count large enough (e.g. > 2.5) {
                             Recompute rate for all URLs in cache;
                             Sort URL_cache_array by rate;
                             Go through sorted URL_cache_array, adding up sizes
             of items to be removed, until if these items were removed, there would
             be enough space in the cache for the new item.  Call this list of items
             remove_array; remove_array may be empty if the cache is not full yet;
629
                         If ((remove_array is non empty and
    633                        URL_rate is greater than the rate for all URLs
             in remove_array) or
                             (remove_array is empty (URL would fit in cache
             already) and
                                URL_rate is greater than
             ComputeRate(last_removed_url)))
                               {
                                  if remove_array is non-empty {
                                      remove all items in remove_array from cache;
                                      set last_removed_url to remove_array[0];
                                  }
    635                           fetch a copy of URLs stream from internet and
             add to cache;
                                  set URL_data_pointer->stream_pointer to location
             in cache;
                                  add URL to URL_cache_array;
                               }
    637                     }
                         }
                     }
                 }
```

(Continued from Fig 6B)

```
641  ┌─Global Constants:
     │   add_estimate_multiplier (suggested value: 3);
     │   last_n_estimate (suggested value: 16);
     └   same_weight (suggested value: 0.2);

643  ┌─ComputeRate subroutine(URL_data) {
     │     double add_estimate = add_estimate_multiplier * (total_second_times
     │  / count_second_times);
     └     double count = 0;

for (int i=number items in URL_data.ticks_seen array; i>=0 && count
     < last_n_estimate; i--)
        {
645  ┌     if (URL_data.same_as_last[i])
     │     {
     │         count += 1;
     │     } else {
     │         count += same_weight;
     │     }
     └  }

┌  int first_tick = URL_data.ticks_seen[i+1];

double ticks = global_clock - first_tick;

647  ┤  double total_ticks = ticks;

if (flCount < last_n_estimate) {
            total_ticks += min(add_estimate, first_tick);
     └  }

649  ┌  double rate = count / total_ticks;
     └  return rate and count;
        }
```

FIGURE 6C

CACHING TECHNIQUES FOR STREAMING MEDIA

TECHNICAL FIELD

This invention relates generally to the technology of network communications and, more particularly, relates to a caching mechanism for streaming media to allocate caching space and resources efficiently based on observed content requests.

BACKGROUND OF THE INVENTION

As computers and computer networks become more prevalent in our society, media distributors more frequently employ computer network channels rather than traditional channels such as television or radio for the distribution of information. Digital distribution of streaming media allows users throughout the world to access media information via the Internet in a timely and efficient manner.

Streaming media, such as streaming audio or video data, comprises media data that is structured and processed essentially in one continuous flow. Streaming data can be contrasted with other data such as downloaded data. The streaming of data typically entails a one-way transmission to the recipient machine, where several seconds of the data stream may be buffered to account for the delays and variability inherent in network packet transmission and receipt. A data download, on the other hand, entails receiving and storing an entire file or other discrete data portion for later use.

In a network environment, the transmission and receipt of data over the network invariably consumes network resources such as network bandwidth and sender and recipient CPU time. To this end, it is often desirable to minimize the amount of network traffic generated. Typically, for web content, a copy of the relevant data may be cached at a proxy or other location so that subsequent requests for the same data can be served from cache rather than from the original server of the information.

For streaming media, caching has proven to be more difficult. In particular, some technologies extract a cost for caching of streaming media, so that although caching may inherently provide benefits, these benefits could be largely offset by the high cost of caching. As one example, in contrast to typical HTTP proxy technology, some streaming technologies do not allow read-while-write caching, but instead require that the cache be served a second copy of the material received over a second connection to the relevant server. Such limitations are due to the generally more complex structure of streaming data. For example, streaming media may embody multiple bit rates, partial content representations such as for fast-forwards, and so forth.

SUMMARY OF THE INVENTION

The present invention provides mechanisms and techniques for caching streaming media in an efficient manner that balances the cost of caching with the benefits to be derived from caching. In general, these techniques are based on the observation of request characteristics, and the use of the observed characteristics to calculate the desirability and practicality of caching a particular streaming media file. In an embodiment, the algorithm for calculating the desirability of caching takes into account the cache size, the number and frequency of requests, and the general level of network activity as well as other factors.

The primary operational premises of the algorithm are that (1) the more requests made for a streaming media file, the more likely that caching that particular file will yield an increase in network usage efficiency and computing efficiency, and (2) similarly, the higher the rate of requests made for a streaming media file, the more likely that caching that particular file will yield an increase in network usage efficiency and computing efficiency. These two premises lead to a number of particular techniques for deciding whether a specific streaming media file will be cached.

Certain techniques are described herein for ascertaining a number of requests and a rate of requests for a streaming media file. In an embodiment, subsequent requests from a same user are discounted by a fractional weighting factor. The time clock of the algorithm may also be adaptive, such that during periods of decreased network traffic, such as on weekends or holidays, the time clock slows, and during periods of increased network traffic, the time clock accelerates. In an embodiment, a comparative technique is utilized to determine whether an item to be cached is more valuable than an item or items already in the cache. This technique is especially significant when cache space is very limited or cache use is very heavy, as is often the case.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 6A–6C are an illustrative listing of pseudocode for managing a streaming media cache in an embodiment of the invention.

DETAILED DESCRIPTION OF THE INVENTION

Figure 1:
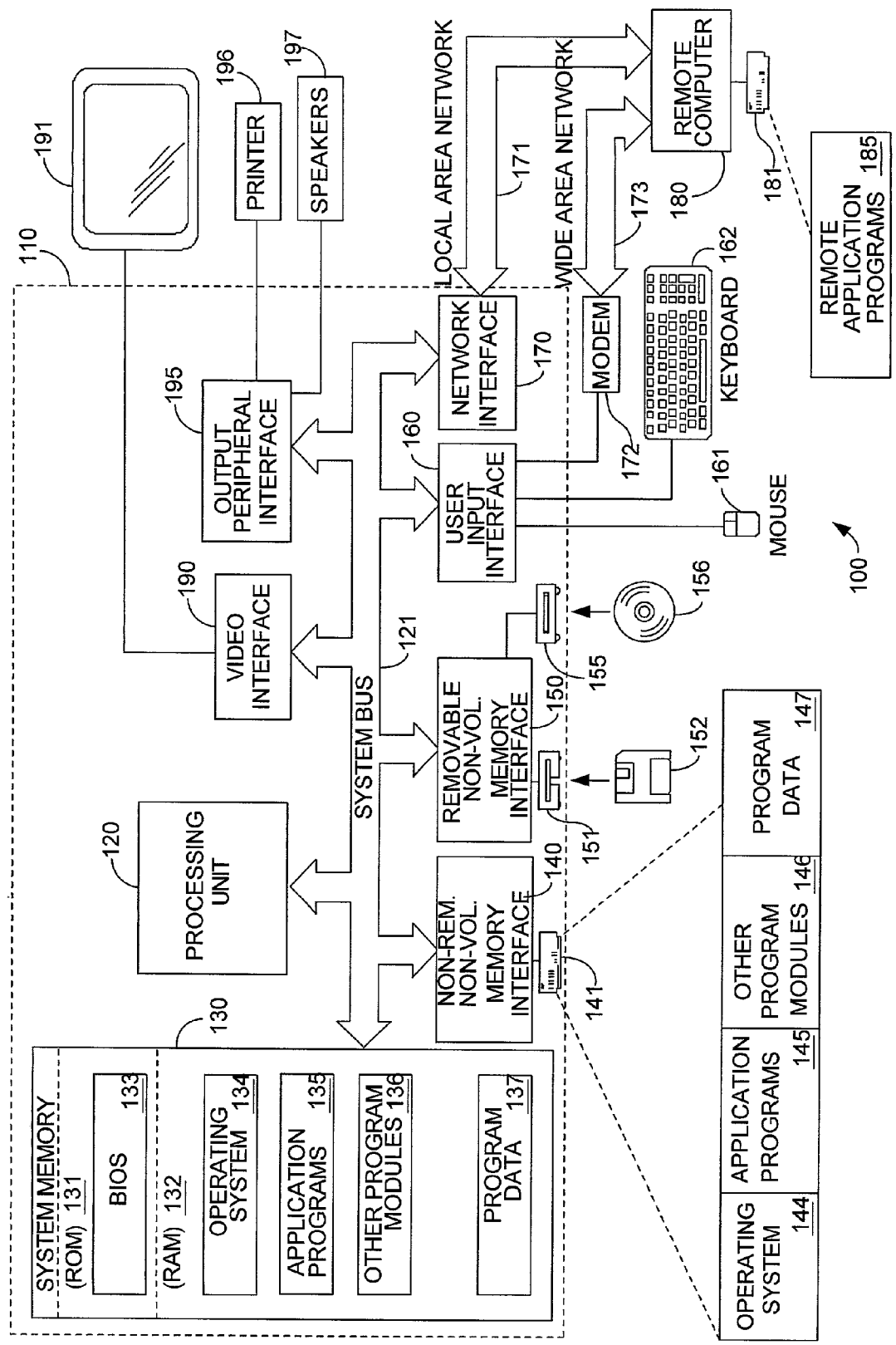
FIG. 1 is a block diagram generally illustrating an exemplary computer system usable in an implementation of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment and may further be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As indicated above, the invention is described in the general context of computer-executable instructions, such as program modules, being executed by a computer. Generally, program modules include routines, programs, objects, components, data structures, etc. that perform particular tasks or implement particular abstract data types.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

When used to implement an embodiment of the invention, the computer 110 generally operates in a networked environment using logical connections to one or more remote computers, such as a remote computer 180. One remote computer 180 will typically be a server or proxy server in an implementation of an embodiment of the invention, but there may additionally or alternatively exist another remote computer that is a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 preferably includes facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. When used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2A:
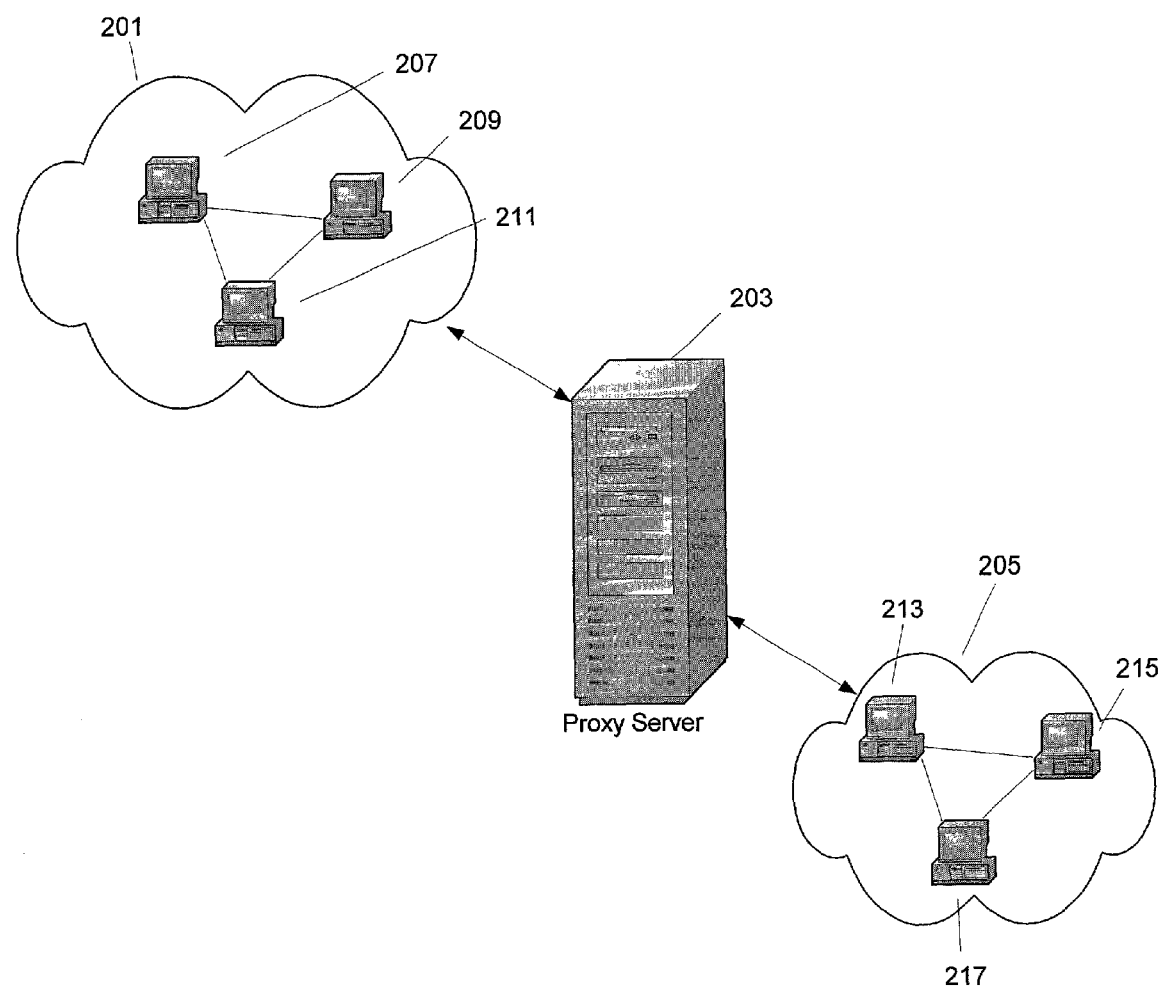
FIG. 2A is a schematic diagram showing the architecture of a network system within which an embodiment of the invention can be implemented.

FIG. 2A illustrates schematically a networking environment in which the present invention can be implemented. The basic architecture of such a system includes an internal network 201 and a proxy 203 that serves as a bridge between the internal network 201 and an external network 205 such as the Internet. The internal network 201 comprises one or more nodes 207, 209, 211, that communicate via the internal network 201 infrastructure, and that may also communicate on the external network 205 via the proxy 203. Similarly, the external network 205 comprises one or more nodes 213, 215, 217 that communicate via the infrastructure of the external network 205, and that may also communicate on the internal network 201 via the proxy 203.

The proxy 203 is a computing device that resides as a node on both the internal network 201 and the external network 205. The proxy device 203 may have any degree of computing capabilities, but typically must at least be able to act as a proxy for the nodes of the internal network, i.e. to send a query or other information from the internal network 201 to the external network 205 on behalf of an internal network 201 node, and to receive a communication from a node on the external network 205 and perform address translation or otherwise route the communication to the intended node of the internal network 201.

Figure 2B:
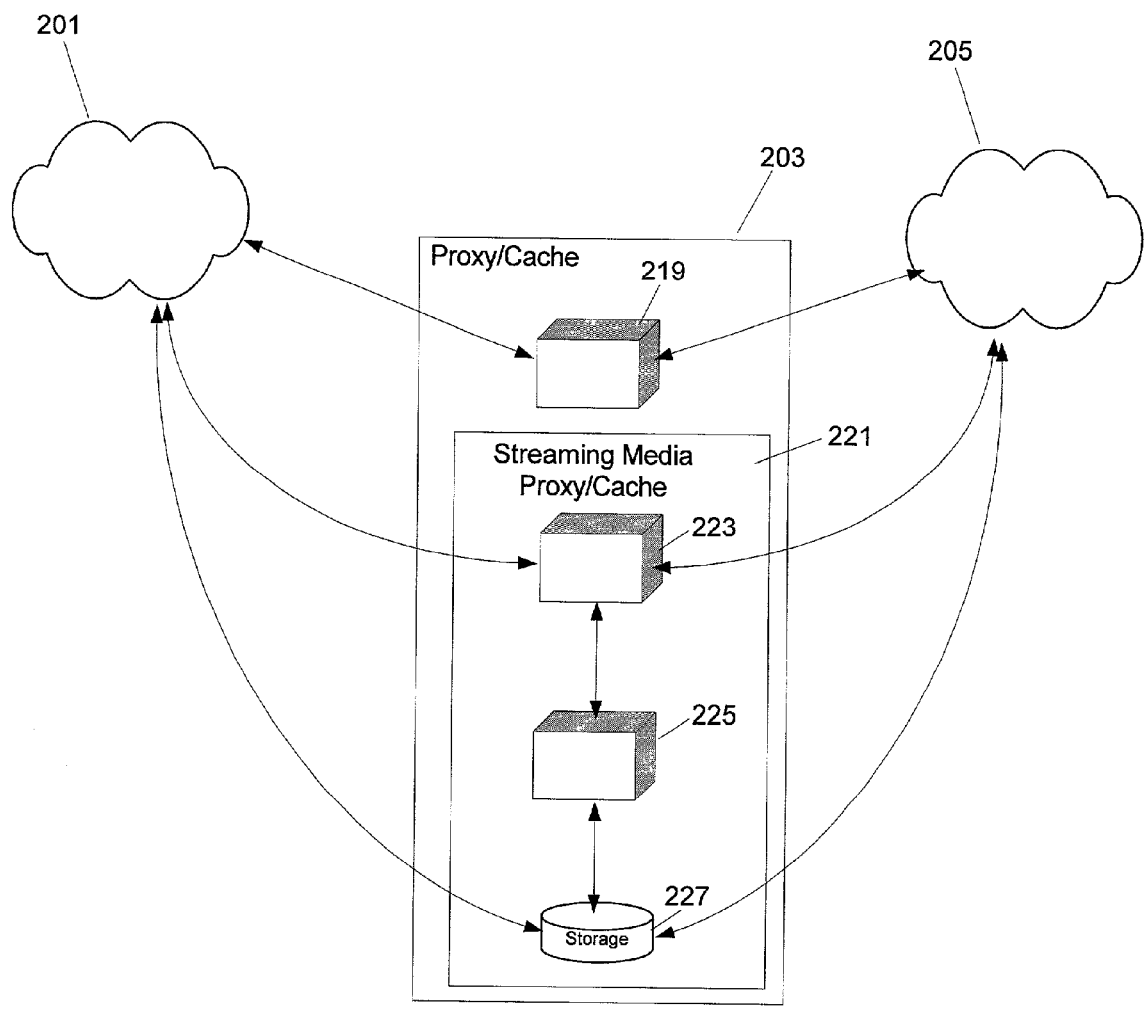
FIG. 2B is a schematic diagram showing the architecture of a network system within which an embodiment of the invention can be implemented including the architecture of a proxy/cache according to an embodiment of the invention.

The functional architecture of the proxy 203 is illustrated in greater detail schematically in FIG. 2B. It can be seen that the proxy 203 functions as a cache and proxy with respect to both streaming and non-streaming media. In particular, the cache and proxy functions with respect to non-streaming media are executed by non-streaming cache/proxy module 219, while the cache and proxy functions for streaming media are executed by streaming cache/proxy module 221. The present description is primarily concerned with caching of streaming media, as executed by cache/proxy module 221.

Cache/proxy module 221 is further comprised of a proxy module 223 and a cache manager 225 communicably linked to one another. The cache manager 225 is communicably linked to a cache storage medium 227, which can be any volatile or nonvolatile storage medium usable to cache streaming media information. For example, the cache storage medium 227 can be a hard disk drive. As will be discussed further hereinafter, the proxy module 223 essentially performs all proxy functions for streaming media in the same way that non-streaming proxy module 219 performs proxy functions for non-streaming media. For example, proxy module 223 may identify its proxied clients as a single IP address on the external network 205, and may perform network address translation (NAT) on packets received from the external network 205 in order to fan each received packet out to the its intended recipient on the internal network 201.

In overview, the cache manager 225 listens generally to network traffic passing through the proxy 203, and specifically to requests for streaming media made by clients on the internal network 201, and monitors responses received from nodes of the external network 205. Subsequently, the cache manager 225 executes a decisional algorithm to determine if a particular repeatedly requested item of streaming media should be cached. If the decision is to cache the item, a second connection with the serving node is opened, when necessary, and a copy of the item downloaded to the cache storage medium 227.

The decisional procedure used by cache manager 225 performs several sub-functions in order to generate a decision regarding the caching of any particular streaming media item. In particular, as will be discussed in greater detail below, the decisional algorithm adds to and subtracts from the material stored in cache storage medium 227, maintains a global clock by which to judge request rates, maintains a list of URLs requested and the number of times that each is requested, maintains or generates an indication of which URLs are cached in the cache storage medium 227, maintains or generates an indication of the amount of space, if any, available at any given time in the cache storage medium 227, maintains or generates an indication of the current rate at which cached URLs are requested, and maintains or generates an indication of the request rate of the last item removed from the cache storage medium 227.

For purposes of this description, note that there exists non-cachable material that may be served to a client. Such material may be live broadcast subject matter, a rapidly expiring material, or any item or content that for any reason is not cachable. Although it is not required to be the case, requests for such items are generally not counted by the processes executed within the decisional procedure. Furthermore, although certain lists or compilations are maintained by the procedure, it will be understood that such lists and compilations preferably are not permitted to grow indefinitely. In particular, items may be removed from the lists and compilations on an LRU basis, as will be discussed hereinafter. That is, when the list or compilation reaches a predetermined limit on its size, such as 10,000 listings, it is culled starting with the least recently used or requested item.

Figure 3:
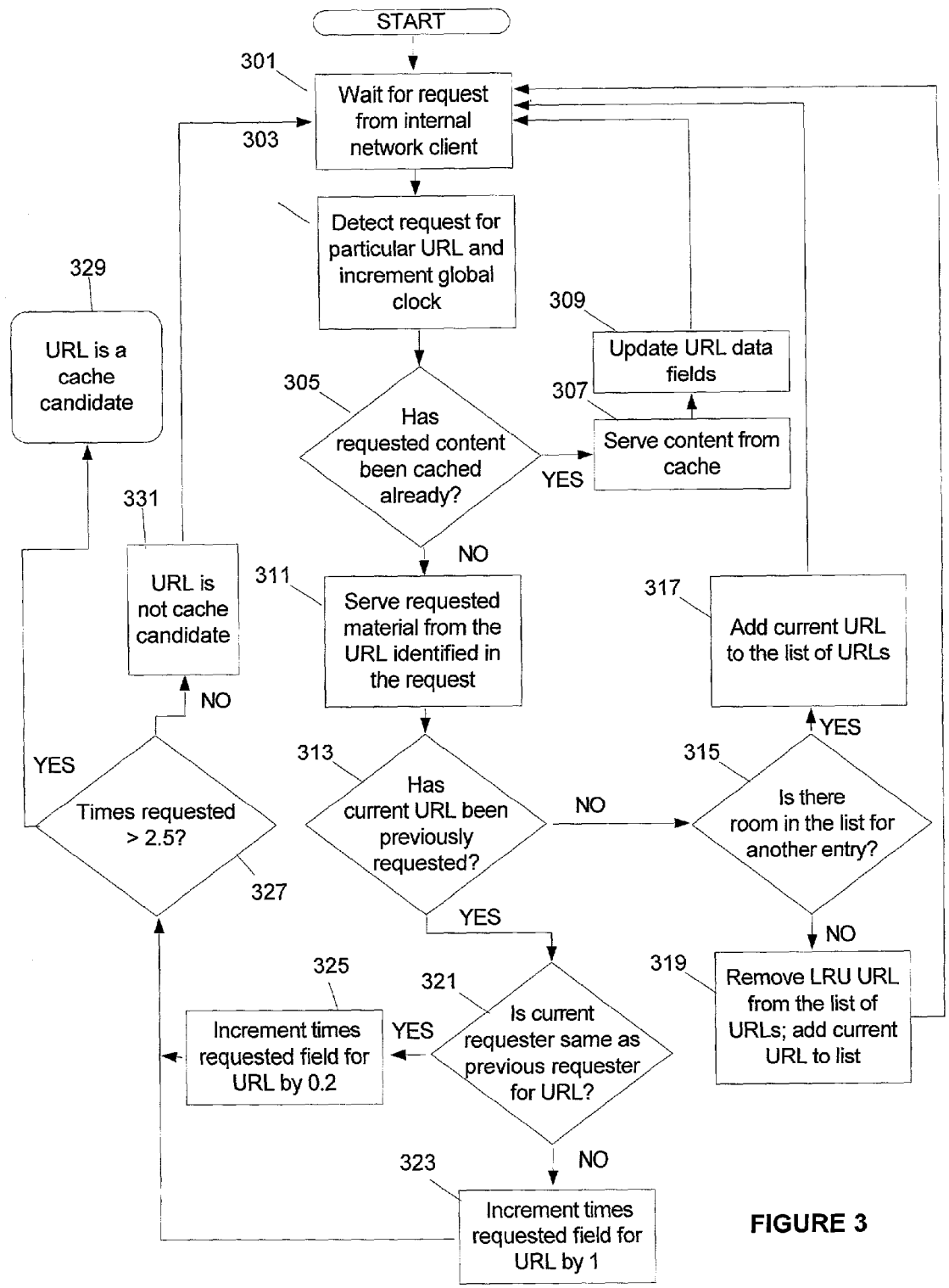
FIG. 3 is a flow chart illustrating a process usable in an embodiment of the invention to determine whether a particular URL represents a cache candidate.

The two primary decisions used by the decisional procedure include a determination of whether a particular item should be cached, and a determination of whether the item will be cached. The decision as to whether an item should be cached hinges primarily on an indication of how popular the item is, i.e. the number of times that the item has been requested. The flow chart of FIG. 3 illustrates a process executed by the decisional procedure for counting the number of times that a particular item of streaming media has been requested. In step 301, the algorithm waits for a request to be issued from an internal network client. In step 303, the algorithm detects that a request for the content identified by a particular URL has been made by an internal network client, and updates a global clock by one tick.

As will be discussed later, the average time over streams between first and second requests is a useful quantity for calculating request rates. Thus, at this point it is also determined whether the current request is the second for the specified URL, and if so, a number of appropriate fields are updated. The cache is checked in step 305 to determine whether the requested content has been cached, and whether the cache is still up to date according to any desired standard. If the requested content has been cached and the cache is up to date, then in step 307, the content is served directly from the cache rather than from the original server, the URL data fields (number of times seen, rate of requests, requester identities, etc.) are updated in step 309, and the process returns to step 301 to await further requests.

If instead it is determined at step 305 that the requested material has not been cached (or that the cache is out of date), then at step 311 the process serves the requested material from the URL identified in the request. Subsequently, in step 313 the process accesses the list of URLs seen in previous requests, and the associated fields specifying the number of times that the URL has been seen as well as the request rate for the URL, and determines whether the current URL of interest is contained in the list. (Note that if at step 303 it was determined that the current request is a second request, then the URL is likely, but not assuredly, recorded in the URL list). If it is not, then at step 315, it is determined whether there is room in the list for another entry. If it is determined that there is room for another entry, then the current URL is added to the list with a request number of "1" and a corresponding request rate (to be discussed later) in step 317, and the process returns to step 301 to await further requests.

If it is instead determined at step 315 that there is not room in the list for another entry, then at step 319 the process removes from the list of URLs the listing corresponding to the least recently requested URL, and adds the current URL with a request number of "1" and a corresponding request rate, to be discussed later. Subsequently, the process returns to step 301 to await further requests.

If at step 313 it is determined that the requested URL is already in the list of URLs, then at step 321 it is determined whether the current requester for that URL is the same as any previous requester for the URL. The quality of sameness may be judged by any single factor or combination of factors. By way of example and not limitation, an internal network address may be used to check whether a current requester is the same as a prior requester, or a media player identity can be used. Note that an internal network address may not be ideally suited for use in identifying a client in some situations, in which situations another exact or approximate measure of sameness should be used instead.

In all cases, any other suitable exact or approximate indication of user identity may equivalently be utilized. While many indicators of sameness entail some inherent inaccuracy, absolute accuracy with respect to requester identity is not critical to the robustness or general functioning of the cache procedure.

If it is determined at step 321 that the current requester is not the same as any prior requester, then the number of times requested field associated with the current URL is incremented by 1 in step 323. If instead, the current requester is the same as a prior requester, then the number of times requested field associated with the current URL is incremented by only 0.2 at step 325. In either case, the request rate is modified if appropriate. The rationale for only increasing the count by 0.2 for a repeat requester is that it has been observed that for the same actual number of requests for the content of a particular URL, the likelihood of a subsequent request for that URL is somewhat linked to the variety of prior requesters. For example, a URL that has been requested 3 times by one requester is less likely to be subsequently requested than is a URL that has been requested once by each of three different requesters.

Regardless of the outcome of step 321, at step 327 the number of requests for the present URL is compared to a predetermined threshold number. In an embodiment, the threshold number is 2.5, as this has been observed to yield satisfactory results. However, any other number can equivalently be used for the threshold determination. If the number of requests exceeds the threshold number, then in step 329 it is determined that the content corresponding to the current URL represents a cache candidate. Otherwise, it is determined at step 331 that the content corresponding to the current URL does not represent a cache candidate, and the process returns to step 301 to await further requests.

For each cache candidate URL, it must now be determined whether or not the corresponding content should actually be cached. While the number of requests for the material, weighted appropriately, formed a basis for identifying the material as a cache candidate, the same metric is not necessarily optimal for deciding which candidates to actually place in the cache generally. This is because streaming audio and video files are generally quite large, while the typical streaming cache size will be limited, leading to a situation where the addition of material to the cache often necessitates the removal from the cache of other material. Thus it is required to value cache candidates and cache residents relative to each other. A metric that relies simply on the number of requests for each URL, weighted by user or otherwise, does not provide information about a given URL's popularity as a function of time. Thus, a rate metric, rather than a counting metric, is more appropriate when a relative valuation between a cache candidate and one or more cache residents is needed. A request rate is essentially the quotient of a number of requests and the number of ticks of the global clock that occurred between the making of the first and last request. A particular methodology for calculating request rates will be discussed in greater detail below.

Figure 4:
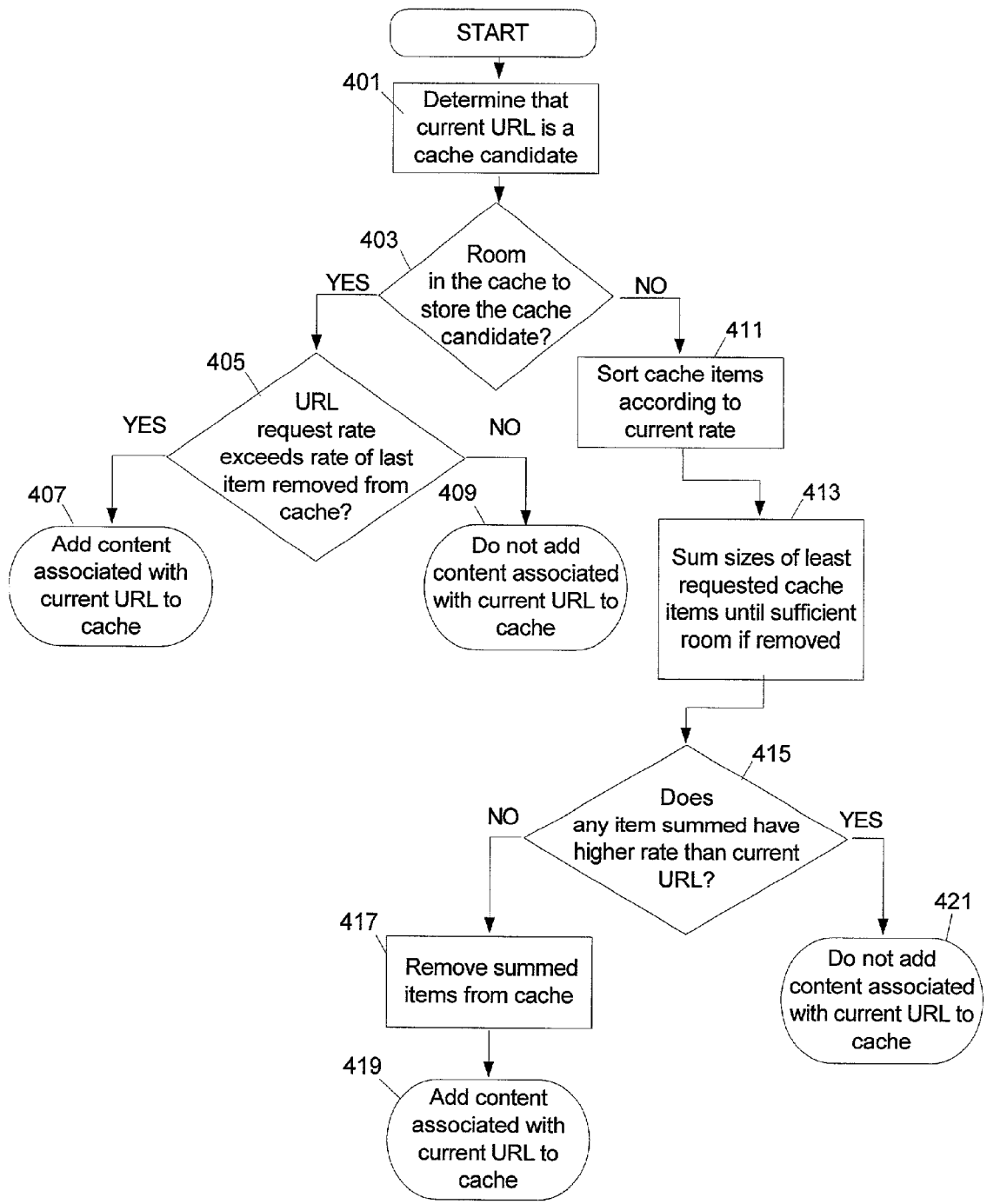
FIG. 4 is a flow chart illustrating a process usable in an embodiment of the invention to determine whether a particular cache candidate should be added to a streaming media cache.

The process for determining whether a particular cache candidate should be cached is shown in the flow chart of FIG. 4. In step 401, an initial determination is made that the current URL is a cache candidate, such as by way of the process illustrated in the flow chart of FIG. 3. Once it has been ascertained that the current URL is a cache candidate, the process flow continues to step 403, where it is determined whether there is currently room in the cache to store the cache candidate. The fact that there is room in the cache to accommodate the content according to the current URL does not necessarily dictate that it is desirable to cache that content. In particular, since there is a cost to caching in many systems, the caching of certain content is inefficient if that content is likely to soon be removed from the cache.

Accordingly, if it is decided at step 403 that there is room in the cache to place the cache candidate, then at step 405 the request rate of the last item to be removed from the cache is calculated, and is compared against the request rate for the current URL. In this way, an approximate indication is obtained as to the probability that the content of the current URL, if added to the cache, would soon be removed from the cache. If the current URL request rate exceeds the request rate of the last item removed from the cache, then at step 407, the content corresponding to the current URL is added to the cache. Note that it is not critical to use, as the basis for comparison, the last item removed from the cache. For example, similarly acceptable results can be obtained at any stage of the process by using the item in the cache having the lowest request rate (once the cache has been filled completely or to some predetermined level) instead of the last item removed from the cache. If instead at step 405 it is determined that the current URL request rate does not exceed the request rate of the last item removed from the cache, then at step 409 it is determined that the content corresponding to the current URL will not be added to the cache.

If at step 403 it is determined that there is not room in the cache to place the cache candidate, then the process must determine whether to replace one or more items in the cache with the content according to the current URL. Thus, at step 411, the current request rates for all cached items and the current URL are computed, and the cache items are sorted according to rate. Next at step 413, the size of the cached items are added together starting from the one with the lowest request rate and continuing in order of increasing request rate until the sum of the sizes equals or exceeds the size of the content corresponding to the current URL.

At step 415, the request rate of the current URL is compared to the rates for the summed items to determine whether any item that was summed has a higher request rate than the current URL. If it is determined at step 415 that no item that was summed has a higher request rate than the current URL, then the summed items are removed from the cache in step 417, and the content according to the current URL is added to the cache in step 419. If instead it is determined at step 415 that one or more items that were summed have a higher request rate than the current URL, then at step 421 it is determined that the content corresponding to the current URL will not be added to the cache.

There are a number of alternative techniques for calculating the request rate as used in the above discussion. The request rate as that concept is used herein corresponds to the number of requests received on average for a particular URL per tick of the global clock, over a predetermined period of time. Before discussing the rate calculations, a short discussion of the concept of the global clock may be helpful to the reader.

In a less preferred embodiment, the global clock can keep time according to the standard world clock, or any other constant clock, and thus ticks of the clock could correspond to seconds, minutes, etc. However, this method of timekeeping is not adaptive, in that ticks accrue during relatively active periods at the exact same rate as during relatively inactive periods. For example, on weekends, evenings, or holidays, network traffic seen by a proxy at a corporate office would decrease significantly over the amount of traffic on an ordinary workday. Thus a URL that is requested in 30% of outgoing network traffic at all times would nonetheless earn a much lower rate during inactive periods since total network traffic during such periods is lower.

It is more desirable that the global clock be adaptive to account for the overall rate of network traffic during the period of concern. In other words, it is more valuable to know the request rate difference between two URLs than to know the absolute request rate of either URL. To this end, for example, an item that is requested frequently during active periods and infrequently during inactive periods should have a relatively high rate. One way to approximately accomplish this objective is to simply establish beforehand different clock speeds for different periods. Thus, weekends could have a defined clock speed that is slower than a defined clock speed for weekdays, and so on.

However in a more accurate embodiment, the global clock registers a tick each time the proxy receives a streaming media request from any proxy client. Consequently, during periods of light network activity, the global clock automatically moves more slowly than during periods of heavy activity. As an example of the usefulness of this embodiment, if there is unusually heavy traffic during a period that normally experiences light traffic, the global clock adjusts automatically, unconstrained by any assumptions as to which discrete periods will experience what levels of traffic.

Figure 5:
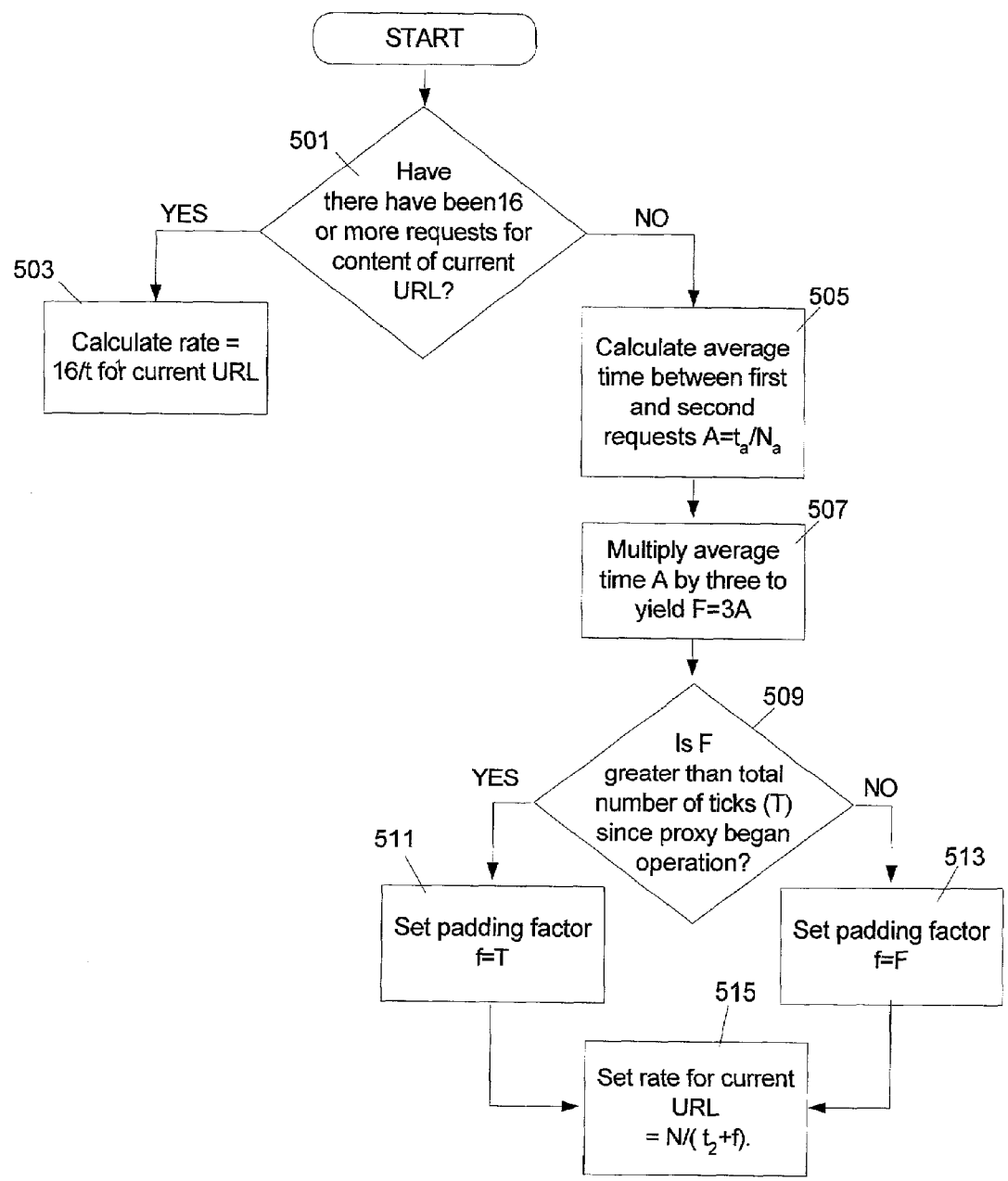
FIG. 5 is a flow chart illustrating a process usable in an embodiment of the invention to determine a request rate for a requested URL within an embodiment of the invention.

A process for computing the request rate associated with a particular URL is shown in the flow chart of FIG. 5. In order to calculate the rate for a particular URL, it is first determined at step 501 whether there have been 16 or more requests for the content associated with that URL. The number 16 has been found to be optimal, but any other number may alternatively be used. Note that the number of requests is tracked in the same manner described above, so that subsequent repeat requests by the same user are counted fractionally rather than wholly.

If it is determined at step 501 that there have been 16 or more requests for the content of the current URL, then at step 503 the quotient rate=$16/t_1$, corresponding to the request rate for the URL, is calculated, where $t_1$ is the number of ticks occurring between the first and last of the preceding 16 consecutive requests for the URL. If it is determined at step 501 that there have not been 16 or more requests for the content of the current URL, then the process advances to step 505. In the case where there has been just one request for a URL, the rate for that URL would be essentially infinite if one simply divided the number of requests by the elapsed time between first and last requests. The same problem persists to a lesser extent for low numbers of requests, such as 2, 3, 4, etc., and decreases as the number of requests grows larger. Thus, it is desirable to add an appropriately chosen padding factor to the denominator of the rate quotient.

Accordingly, in steps 505–513 a padding factor f is calculated. Because the purpose of the padding factor is to account for the existence of a relatively low number of requests for a particular URL the padding factor is related to the average time between hits over all URLs seen. Thus in step 505, the average over streams seen by the proxy of the time between first and second requests is calculated. To compute this average time, two counters are maintained. The first records approximately the total time between all first and second requests, $t_a$. The second records approximately the total number of second requests, $N_a$. The reason that the counters are said to only approximately record the respective total numbers of times and requests is that each counter is weighted to more heavily emphasize recent activity and to avoid overflow. In particular, before each counter is incremented, its prior content is multiplied by a decay factor such as 0.9999. The average time between first and second requests, A, is then calculated according to the relationship $A=t_a/N_a$.

It has been observed that the aforementioned calculation often yields an average time between first and second requests that is low. Thus, having calculated an average time over streams between first and second requests, the process flows to step 507, wherein the average time A is multiplied by three to yield the quantity F=3A. At step 509, it is determined whether F is greater than the total number of ticks T that have occurred since the proxy began operation. If it is determined at step 509 that F is greater than T, then the padding factor f is set equal to T at step 511. If it is instead determined at step 509 that F is not greater than T, then the padding factor f is set equal to F at step 513.

Finally at step 515, the rate for the current URL is set equal to the number of requests N for the current URL divided by the number of ticks $t_2$ elapsed between the first and last request and the padding factor f, such that rate=$N/(t_2+f)$.

Note that the aforementioned techniques for cache content accrual and maintenance are not necessarily the only processes acting on the streaming media cache. For example, it may be desirable to periodically remove one or more items having the lowest request rates from the cache, such that at most times a certain percentage or amount of the cache storage capacity remains available.

An example process for maintaining the cache and associated data is illustrated in pseudo-code form in FIGS. 6A–6C. It can be seen that the process establishes a URL_data structure in section 601. The structure includes fields, section 603, for tracking the time when various requests, or "hits," were received and whether any hit is a repeat hit from a prior user. The URL_data structure in section 601 also tracks where in the cache a particular stream is stored if the stream has been stored in cache, through the use of a stream pointer (stream_pointer) identified in section 605. Certain optional fields, as in section 607, can be included to enhance the efficiency of the process, but such fields are not required.

The global variables 609 defined for the process include a variable URL_data_hashtable 611, which is usable to map a particular URL to its data in the URL_data structure. Also included as a global variable is URL_cache_array 613, an array which tracks which URLs are currently represented in the cache. The global variable Tick global_clock 615 represents the current value of the global clock at any particular time during the process.

After computing the quantities total_second_times 617 and count_second_times 619 usable to compute the average time between first and second hits, the procedure processes each request in section 621. In particular, the request causes the global clock to be incremented by one tick, and further causes the variable count_second_times 619 to be incremented by one if the request is the second request for the same URL. Furthermore, if the request is the second request for the same URL, the variable total_second_times 617 is incremented by the number of ticks between the current request and the first request for the same URL. Finally, both quantities total_second_times 617 and count_second_times 619 are multiplied by 0.9999 to provide exponential decay and to avoid overflow as discussed above. The list of URLs seen is optionally culled on an LRU (least recently used) basis when necessary to maintain a certain amount of empty space in the cache at section 623.

Various data fields associated with the URL_data structure for the current URL are updated as shown in section 625. In section 627, the requested content is served from cache if available, or from the Internet or other network source if the content has not been cached. The process determines in section 629 whether to add the content from the current URL to the cache, and adds the material to the cache if appropriate. In particular, in section 631 the number of requests for the current URL is tallied and compared to a threshold count limit to determine whether the URL is a cache candidate as described above. Subsequently in section 633, if the URL is a cache candidate because its URL_count is sufficiently large, the request rate for the current URL is compared to the request rate for any URLs that would be displaced from the cache upon the addition of the current URL.

Also in section 633, if the rate of the current URL exceeds the rate for any potentially displaced URL, then the cache is cleared of enough existing entries to allow room for the addition of the current URL stream to the cache. In some cases, the cache may contain sufficient capacity so that the current URL stream can be added without the removal of any other information from the cache. Finally, at section 635, the current URL's stream is fetched via the Internet or other network and added to the cache. At section 637, the URL_data_pointer, corresponding to the stream_pointer for the particular URL, is set to the location in the cache that the content for the current URL is stored, and the URL_cache_array is supplemented with the current URL.

In section 639, the ComputeRate subroutine utilized in the process of sections 601–637 is defined. In particular, section 641 first defines the global constants utilized by the subroutine, including "add_estimate_multiplier," with a preferred value of 3, "last_n_estimate," with a preferred value of 16, and "same_weight," with a preferred value of 0.2. The use of the preferred values for these variables is not required, and any other suitable values may be used instead. In section 643, the ComputeRate subroutine operates on the URL_data by first a computing value that is three times the average time between first and second hits (add_estimate_mulitplier*total_second_times/count_second_times) as discussed above. Next, the subroutine in section 645 accounts for the fact that a current requester may be identical to a prior user as discussed above. In particular, it will be seen that the count is incremented by one (1) if the current user is not the same as a prior user, and is incremented by only same_weight (with a preferred value of 0.2) if the current user is the same as a prior user.

In section 647, the subroutine sets the padding factor to the minimum of the padding factor calculated in section 643 and the total number of ticks elapsed up to the current time. Finally, in section 649, the subroutine calculates and returns the rate (count/total_ticks).

It can be seen that if the ComputeRate subroutine is called twice for a particular URL when there have not been any requests for the same URL between the two calls, then "count" and "ticks" will have the same value on both calls, although "total_ticks" will not. In an embodiment, efficiency is gained by storing the values of "count" and "ticks" in incremental_count and incremental_ticks fields of the URL_data structure. Furthermore, note that each URL is associated with an Array<Tick>and an Array<bit>. In an embodiment, the bit array is stored as a bit vector of 32 or 64 bits. Additionally, once the count reaches the last_n_estimate, earlier array elements can be eliminated, allowing implementation of the arrays as static length arrays.

In the above discussion, the identity of a requester as the same or different as a prior requester has been used to aid in the rate calculations. However, user identification information may be substantial in size and may require excessive resources to store. Accordingly, in an embodiment of the invention, the user identifying information such as GUID, IP address, media player ID, etc. are hashed and the hash value stored. Two identical hash values indicate a high likelihood of identical users. To the extent that inaccuracies are introduced by way of the hashing technique, the caching procedure will still function, and any decrease in performance will likely be offset by the benefits of increased storage efficiency.

Figure 7:
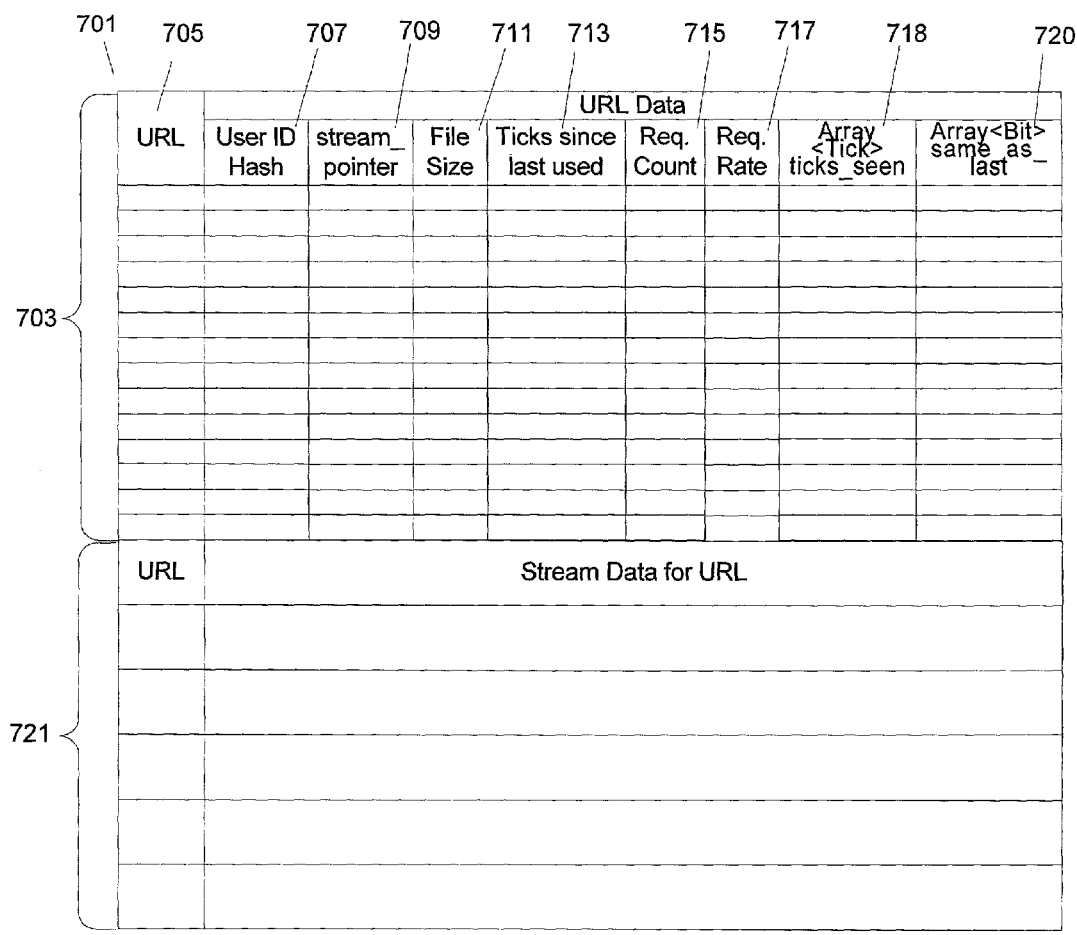
FIG. 7 is a schematic diagram illustrating a URL data structure usable in an embodiment of the invention to store URL data and to cache URL content.

An exemplary data storage structure and arrangement 701, including a cache for streaming media content is shown schematically in FIG. 7. The first section 703 of the data structure 701 comprises an array having a column 705 for identifying a URL, as well as associated columns for identifying relevant URL information. Such information preferably includes a requester identification such as a user ID hash 707, in order to facilitate storage and retrieval of user information for use in request count and rate calculations. Note also that the identification of a URL need not be explicit, but may be implicit such as by hash or other identifier. Also preferably stored in data structure 703 is a key such as a stream_pointer value 709 for identifying a location in the cache structure 721 that holds the stream data associated with the corresponding URL. File size field 711 identifies the size of the stream associated with each corresponding URL.

Additional fields may include a Last Used field 713 that stores an indication of the number of ticks of the global clock that have elapsed since the URL was last requested. This field is intended primarily for facilitating the sorting of the URL entries from most to least recently used as discussed above. Such sorting is useful for identifying a group of least recently requested URLs for removal from the URL list to avoid unchecked growth of the data structure. The data structure 703 may also comprise columns for storing a request count 715 and a request rate 717 for each URL. These fields may be updated opportunistically during current calculations to aid in future calculations, or they may be affirmatively updated periodically. Finally, the data structure 701 preferably also includes fields Array<Tick>ticks_seen 718 and Array<Bit>same_as_last 720.

Note that the data structure illustrated in FIG. 7 is abbreviated for clarity, and that in practice the structure 701 will generally include other URL data fields in addition to the fields shown and/or in place of some or all of the fields shown. For example, the optional fields described above (incremental_count and incremental_ticks) can also be stored in the URL data structure 701. Note also that the number of the URL data fields 707–713 is not limited and can thus be established at whatever number best serves a particular implementation. Furthermore, as can be seen, the URL data fields are not limited to storing information usable to calculate request counts and/or rates. The structure 701, and in particular section 703, provides a convenient location to store any information associated with any URL for purposes of necessity or convenience.

A second portion 721 of the structure 701 may be located adjacently to or remotely from the section 703. The second portion 721 of the structure 703 represents physical streaming media cache storage facilities, and is used to store the cached streaming media data and an associated URL or URL identification information. As discussed above, a particular item of streaming media may be located by following a stream_pointer accessed earlier, such as from the URL data section 703. It will be understood that the relative sizes of various fields in the figure do not carry any implication as to the actual sizes of the various fields. Thus, fields depicted by areas of equal length in the figure may be of any suitable length, whether equal or not. Note that the URL data and/or the cache data may be saved in persistent storage as well, if it is desired that such information be available upon restart of the cache/proxy service or the machine itself.

Although the above examples are given in the context of a client node on a first network that interfaces with a server node a second network via a proxy server, the invention is not limited to such environments. In an embodiment, the client and server are nodes on the same network or otherwise communicate without an intervening proxy server. In this embodiment, the process for determining cache candidates and actual cache contents is executed with respect to the client machine. Thus, for example, there is no determination made as to whether a current requester is identical to a prior requester, since all requests seen by the client originate with the client. Similarly, in this embodiment the relevant traffic used to increment the global clock is the traffic originating from the client itself.

In the aforementioned embodiment, other determining factors may be used to augment the number and rate calculations used to determine cache candidates and cache contents. For example, a client's history with respect to patterns of usage and frequency of use can be further used, if available, to aid in determining which streams are cache candidates and which cache candidates will be stored in the cache.

Furthermore, while streaming data usually comprises audio and/or video data, the invention does not require such. The transmission of any type of streaming data may benefit to some degree from the mechanisms described herein.

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention. Network connections may be circuit-switched, packet-switched, or otherwise, and may be transient or permanent, hard-wired or wireless, operating via any suitable protocol. Therefore, the invention as described herein contemplates all such embodiments as may come within the scope of the following claims and equivalents thereof.

We claim:

1. At a proxy server communicably linked to a first network and communicably linked to a second network, the first network including at least one client computer and the second network including at least one server computer, a method of caching streaming media content from a server computer at the proxy server to facilitate more efficient client computer access to the streaming media content, the method comprising:

receiving a request for streaming media content from a client computers included in the first network, the request directed to a server computer in the second network, the request corresponding to a resource identifier that identifies streaming media content maintained by the server computer;

determining that the number of requests for the identified streaming media content satisfies a threshold indicative of the streaming media content being a candidate for caching at the proxy server, the determination based on analysis of the received request and on analysis of one or more previously received requests for the identified streaming media content from client computers in the first network, the one or more previously received requests being received at the proxy server prior to the received request being received at the proxy server;

in response to the threshold being satisfied, calculating a request rate for the resource identifier based on the number of ticks of an adaptive global clock that occurred between reception of the first previously received request and reception of the received request, the ticks of the adaptive global clock accruing at different rates according to the level of network activity at the network proxy;

determining that the calculated request rate is greater than the request rate for at least one resource identifier corresponding to streaming media content previously cached at the proxy server; and caching the requested streaming media content at the proxy server.

2. The method according to claim 1, wherein the resource identifier is a URL, and wherein the second network is a wide area network.

3. The method according to claim 2, wherein the wide area network comprises the Internet, and the first network comprises a local area network.

4. The method according to claim 1, wherein determining that the number of requests for the identified streaming media content satisfies a threshold further comprises:

ascertaining whether the received request for the streaming media content is the first request from any of the at least one client computers; and adding the selected resource identifier to a list of previously requested resource identifiers if the received request is the first request for the selected streaming media content, wherein each resource identifier in the list is associated with an identity of a client computer previously requesting content associated with that resource identifier.

5. The method according to claim 4, further comprising:

determining via the list of previously requested resource identifiers whether the requesting client computer is the same as any client computer previously requesting the streaming media content;

incrementing the number of requests by a first predetermined value if the requesting client computer is not the same as any client computer previously requesting the streaming media content; and incrementing the number of requests by a second predetermined value if the requesting client computer is the same as a client computer previously requesting the streaming media content, whereby the number of requests identifies a count value representing the number of times that the selected streaming media content has been requested by any of the at least one client computers.

6. The method according to claim 1, further comprising:

comparing the number of requests to a predetermined count threshold;

determining that the selected streaming media content is a cache candidate based on the number of requests exceedings the predetermined count threshold; and checking the cache to determine how the cache is to be adjusted to store the streaming media content.

7. A proxy server for communicating between a local area network and a wide area network comprising:

one or more processors;

system memory;

one or more computer storage media having stored thereon a non-streaming media proxy and cache module for proxying requests for non-streaming media content from nodes of the local area network and responses thereto from nodes of the wide area network, and for establishing and maintaining a cache for retrievably storing requested non-streaming media content; and one or more computer storage media having stored thereon a streaming media proxy and cache module comprising:

a proxy module for proxying requests from nodes of the local area network for streaming media content and responses thereto from nodes of the wide area network;

a streaming media cache for retrievably and selectively storing requested streaming media content; and a cache manager for establishing and maintaining the contents of the streaming media content cache, wherein the cache manager determines when to add streaming media content to the cache, the cache manager configured to:

determine that the number of requests for streaming media content satisfy a threshold indicative of the streaming media content being a candidate for caching at the proxy server, the determination based on analysis of received requests for the identified streaming media content from nodes in the local area network; and in response to a threshold being satisfied, calculate a request rate for a corresponding resource identifier based on the number of ticks of an adaptive global clock that occurred between reception of received requests for the streaming media content, the ticks of the adaptive global clock accruing at different rates according to the level of network activity at the proxy server such that ticks of the global adaptive clock represent different amounts of time relative a standard world clock depending on the level of network activity;

determine that a calculated request rate is greater than the request rate for at least one resource identifier corresponding to streaming media content previously cached at the proxy server.

8. A computer program product for use at a proxy server communicably linked to a first network and communicably linked to a second network, the first network including at least one client computer and the second network including at least one server computer, the computer program product for implementing a method of caching streaming media content from a server computer at the proxy server to facilitate more efficient client computer access to the streaming media content, the computer program product comprising one or more computer storage media having stored thereon computer-executable instructions that, when executed by a processor, cause the proxy server to perform the following:

receive a request for streaming media content from a client computer included in the first network, the request directed to a server computer in the second network, the request corresponding to a resource identifier that identifies streaming media content maintained by the server computer;

determine that the number of requests for the identified streaming media content satisfies a threshold indicative of the streaming media content being a candidate for caching at the proxy server, the determination based on analysis of the received request and on analysis of one or more previously received requests for the identified streaming media content from client computers in the first network, the one or more previously received requests being received at the proxy server prior to the received request being received at the proxy server;

in response to the threshold being satisfied, calculate a request rate for the resource identifier based on the number of ticks of an adaptive global clock that occurred between reception of the first previously received request and reception of the received request, the ticks of the adaptive global clock accruing at different rates according to the level of network activity at the network proxy;

determine that the calculated request rate is greater than the request rate for at least one resource identifier corresponding to streaming media content previously cached at the proxy server; and cache the requested streaming media content at the proxy server.

* * * * *